United States Patent
Garrett et al.

(10) Patent No.: US 10,674,672 B2
(45) Date of Patent: Jun. 9, 2020

(54) FREE-ROLLING ROTOR CAGE

(71) Applicant: CNH INDUSTRIAL AMERICA LLC, New Holland, PA (US)

(72) Inventors: Robert Garrett, Conestoga, PA (US); Terry Scott Moyer, Denver, PA (US); Jesse Jordan Curtis, Columbus, PA (US)

(73) Assignee: CNH Industrial America LLC, New Holland, PA (US)

( * ) Notice: Subject to any disclaimer, the term of this patent is extended or adjusted under 35 U.S.C. 154(b) by 202 days.

(21) Appl. No.: 15/876,587

(22) Filed: Jan. 22, 2018

(65) Prior Publication Data

US 2019/0223383 A1    Jul. 25, 2019

(51) Int. Cl.
| | | |
|---|---|---|
| *A01F 12/56* | (2006.01) | |
| *A01F 7/06* | (2006.01) | |
| *A01F 12/10* | (2006.01) | |
| *A01F 12/44* | (2006.01) | |
| *A01F 12/18* | (2006.01) | |
| *A01F 12/58* | (2006.01) | |

(52) U.S. Cl.
CPC ............ *A01F 12/56* (2013.01); *A01F 7/062* (2013.01); *A01F 7/065* (2013.01); *A01F 12/10* (2013.01); *A01F 12/185* (2013.01); *A01F 12/442* (2013.01); *A01F 12/58* (2013.01)

(58) Field of Classification Search
CPC .......... A01F 7/062; A01F 12/442; A01F 7/06; A01F 12/18; A01F 12/00; A01F 29/16
See application file for complete search history.

(56) References Cited

U.S. PATENT DOCUMENTS

| | | | | |
|---|---|---|---|---|
| 771,368 | A | * 10/1904 | Jakob | ............... B07B 1/24 |
| | | | | 209/297 |
| 3,306,302 | A | * 2/1967 | Hing | .............. A01F 12/18 |
| | | | | 460/46 |
| 3,410,270 | A | * 11/1968 | Herbsthofer | ......... A01F 12/181 |
| | | | | 460/67 |
| 3,703,802 | A | 11/1972 | Wrestler et al. | |
| 4,178,942 | A | 12/1979 | Nusser | |

(Continued)

FOREIGN PATENT DOCUMENTS

| | | |
|---|---|---|
| CN | 202551722 U | 11/2012 |
| CN | 1050009829 A | 11/2015 |

(Continued)

*Primary Examiner* — Arpad Fabian-Kovacs
(74) *Attorney, Agent, or Firm* — Peter Zacharias; Patrick Sheldrake (57) ABSTRACT

A threshing and separating system including a non-stationary rotor cage including a perforated cylindrical body extending in a longitudinal direction from a first open end portion to a second open end portion. The first open end portion supported by a first rotatable coupling point, and the second open end portion supported by a second rotatable coupling point. The threshing and separating system also includes a rotor configured to rotate within the non-stationary rotor cage to thresh harvested crop. The non-stationary rotor cage is configured to rotate about an axis extending between the first rotatable coupling point and the second rotatable coupling point, and to be rotationally driven by the rotor via the threshed harvested crop.

20 Claims, 11 Drawing Sheets

(56) References Cited

U.S. PATENT DOCUMENTS

| | | | |
|---|---|---|---|
| 4,198,802 A * | 4/1980 | Hengen | A01F 12/442 56/14.6 |
| 4,274,426 A * | 6/1981 | Williams | A01F 7/062 460/67 |
| 4,284,086 A | 8/1981 | Williams | |
| 4,700,718 A * | 10/1987 | Rissanen | A01F 7/062 460/61 |
| 4,904,224 A * | 2/1990 | Pohjala | A01F 12/00 460/59 |
| 4,919,642 A | 4/1990 | Sukup et al. | |
| 4,957,467 A * | 9/1990 | Zachary | A01F 12/442 460/69 |
| 5,045,025 A | 9/1991 | Underwood | |
| 5,356,338 A | 10/1994 | Braunhardt et al. | |
| 5,803,807 A | 9/1998 | Satzler | |
| 6,213,870 B1 | 4/2001 | Satzler | |
| 6,468,152 B2 * | 10/2002 | Moriarty | A01F 7/06 460/67 |
| 9,131,640 B2 | 9/2015 | Brockmann | |
| 2015/0065212 A1 | 3/2015 | Kvist | |

FOREIGN PATENT DOCUMENTS

| | | |
|---|---|---|
| JP | 04346719 A | 12/1992 |
| JP | 05030848 A | 2/1993 |
| JP | 2015139436 A | 8/2015 |
| RU | 165246 U1 | 10/2016 |
| RU | 2602612 C1 | 11/2016 |
| WO | 2013032388 A1 | 3/2013 |

* cited by examiner

FREE-ROLLING ROTOR CAGE

FIELD

The invention relates to a free-rolling rotor cage in a combine threshing and separating system.

BACKGROUND

Harvesters (e.g. combines) are used to harvest crops. Operations performed by these combines include threshing and separating grain from materials other than grain (MOG). These operations are conventionally performed by a rotor that rotates in a stationary rotor cage. Ideally, as the rotor rotates, the grain is separated from the MOG and falls through perforations in the rotor cage to a grain collection system. The remaining MOG is too big to fall through the perforations and is transported by the rotor towards a residue handling system. This configuration, however, suffers from grain loss, because the rotor and cage are inefficient in separating the grain from the MOG.

SUMMARY

An embodiment includes a threshing and separating system comprising a non-stationary rotor cage including a perforated cylindrical body extending in a longitudinal direction from a first open end portion to a second open end portion. The first open end portion supported by a first rotatable coupling point, and the second open end portion supported by a second rotatable coupling point. The threshing and separating system also includes a rotor configured to rotate within the non-stationary rotor cage to thresh harvested crop. The non-stationary rotor cage is configured to rotate about an axis extending between the first rotatable coupling point and the second rotatable coupling point, and to be rotationally driven by the rotor via the threshed harvested crop.

An embodiment includes a combine comprising a feeder housing for receiving harvested crop, and a non-stationary rotor cage including a perforated cylindrical body extending in a longitudinal direction from a first open that receives the harvested crop end portion to a second open end portion that expels the harvested crop. The first open end portion supported by a first rotatable coupling point, and the second open end portion supported by a second rotatable coupling point. The combine also comprises a rotor configured to rotate within the non-stationary rotor cage to thresh the harvested crop. The non-stationary rotor cage is configured to rotate about an axis extending between the first rotatable coupling point and the second rotatable coupling point, and to be rotationally driven by the rotor via the threshed harvested crop.

DETAILED DESCRIPTION

Aspects of the invention provide a free-rolling rotor cage for use in a combine threshing/separating system. As used herein, the phrase free-rolling rotor cage means a non-stationary rotor cage that is driven only by the force imparted on the rotor cage by the rotor via the crop material. The terms free-rolling rotor cage and non-stationary rotor cage are used interchangeably throughout. The free-rolling behavior of the non-stationary rotor cage allows the rotor cage to rotate during threshing, and increases the efficiency of the threshing/separating system resulting in decreased grain loss.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
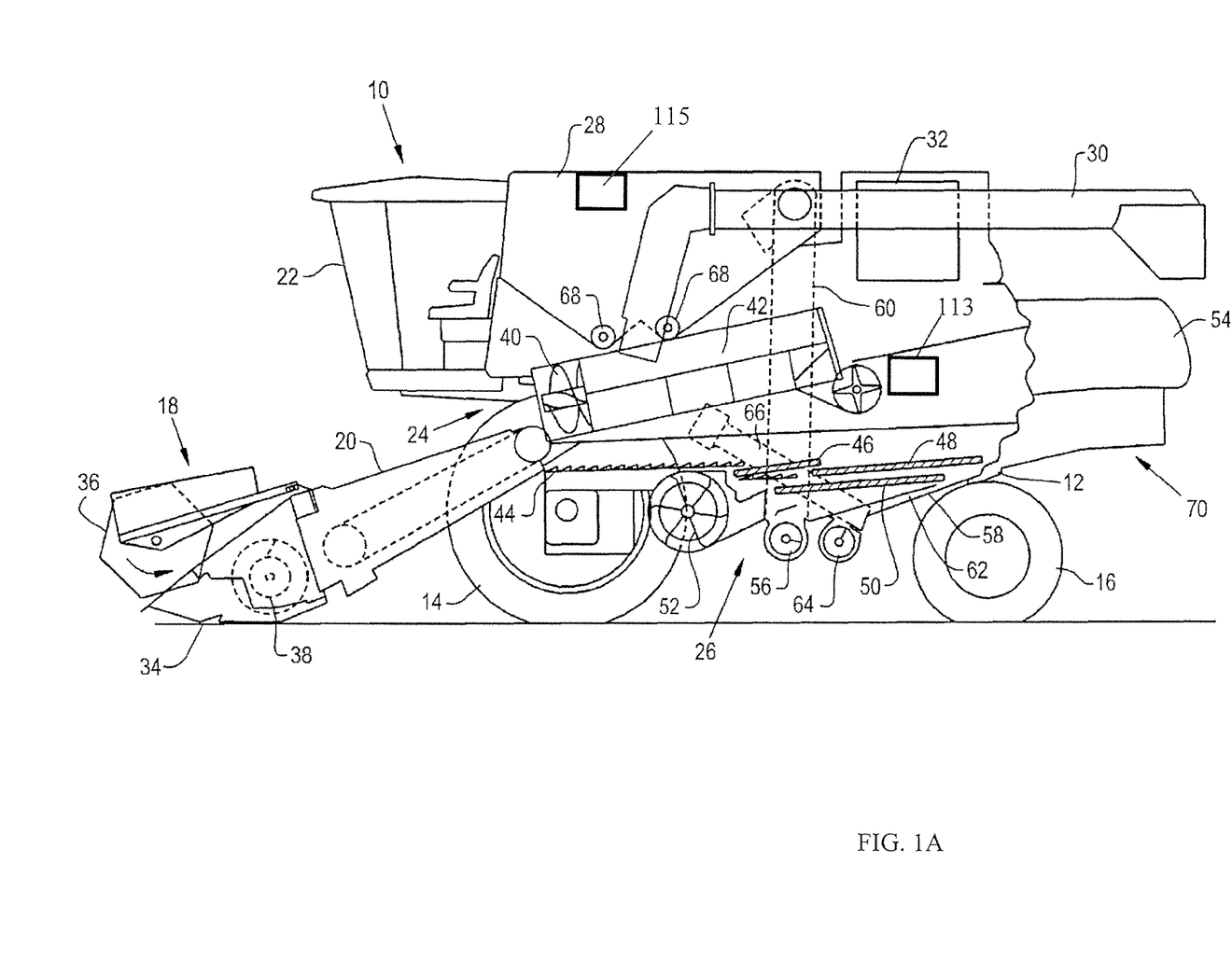
FIG. 1A is a side view of a combine, according to an embodiment of the invention.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42 (i.e. rotor cage) that is rotatable around the rotor. The cut crops are threshed and separated by the rotation of rotor 40 within rotor cage 42, and larger elements, such as stalks, leaves and the like are propelled through the length of the rotor cage 42 and then discharged from the rear of combine 10. Smaller elements of crop material including grain and non-grain crop material, including particles lighter than grain, such as chaff, dust and straw, are discharged through perforations of rotor cage 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper 114, a chopper pan 116, counter knives 117, a windrow door 104 and a residue spreader 110. When combine 10 operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing through the passageway created by the open windrow door.

The combine also monitors both yield and loss of the grain to ensure efficient operation. Loss is generally defined as a percentage of grain lost. Loss includes grain that is accidentally blown by fan 52 into the straw hood 54 and ejected from the combine rather than collected in the tank. In contrast, yield is generally defined as the amount of grain collected in the tank (e.g. bushels).

Loss may be monitored by a loss sensor (also referred to herein as a "loss monitor") that could be positioned within straw hood 54 of residue system 70, and/or positioned near the output of threshing/separating system 24 as loss sensor 113. Loss sensor 113 may be an acoustic sensor that detects certain audible frequencies that are associated with grain hitting structural components as the grain is moved from the rotor towards the residue system. For example, grain (e.g. seeds) may make a distinctive sound as compared to the chaff when they hit sieves 46/48. A signal indicating this detection can be sent to a controller (not shown) that counts the number of hits to compute the amount of grain that is lost during operation of the threshing/separating system 24.

Yield may be monitored by a yield sensor 115 (also referred to herein as a "yield monitor") that could be positioned within grain tank 28 (see FIG. 1A). Yield sensor 115 may be an acoustic sensor, radar sensor or the like that measures distance. Generally, yield sensor 115 transmits a signal towards the bottom of grain tank 28 and receives a reflection signal from the grain. A controller uses the round-trip travel time of the signal to compute the distance from the sensor to the pile of grain. The controller uses this distance to determine how much grain is in grain tank 28 at any given time. As the grain pile grows, the roundtrip travel time of the signal will decrease indicating that the grain is getting closer to the top of grain tank 28.

Throughput is yet another metric that can be determined based on yield. As described above, yield is determined based on signals transmitted and received by yield sensor 115. Throughput is the amount of crop being processed by the combine at a given time. Generally, throughput can be computed by measuring yield over a time period. For example, if the yield sensor detects that grain tank 28 holds 10 bushels at time T, and then detects that grain tank 28 holds 10.1 bushels at time T+6 seconds, the throughput can be determined as 1 bushel per minute. In another example, if the yield sensor detects that grain tank 28 holds 10 bushels at time T, and then detects that grain tank 28 holds 10.3 bushels at time T+6 seconds, the throughput can be determined as 3 bushel per minute.

Both loss and throughput are factors that may be beneficial to controlling the various mechanical devices within the combine. In particular, loss may be beneficial in controlling the rotor and rotor cage in threshing system 24. More details of the rotor and rotor cage in threshing system 24 are shown in FIGS. 1B-1F.

Figure 1B:
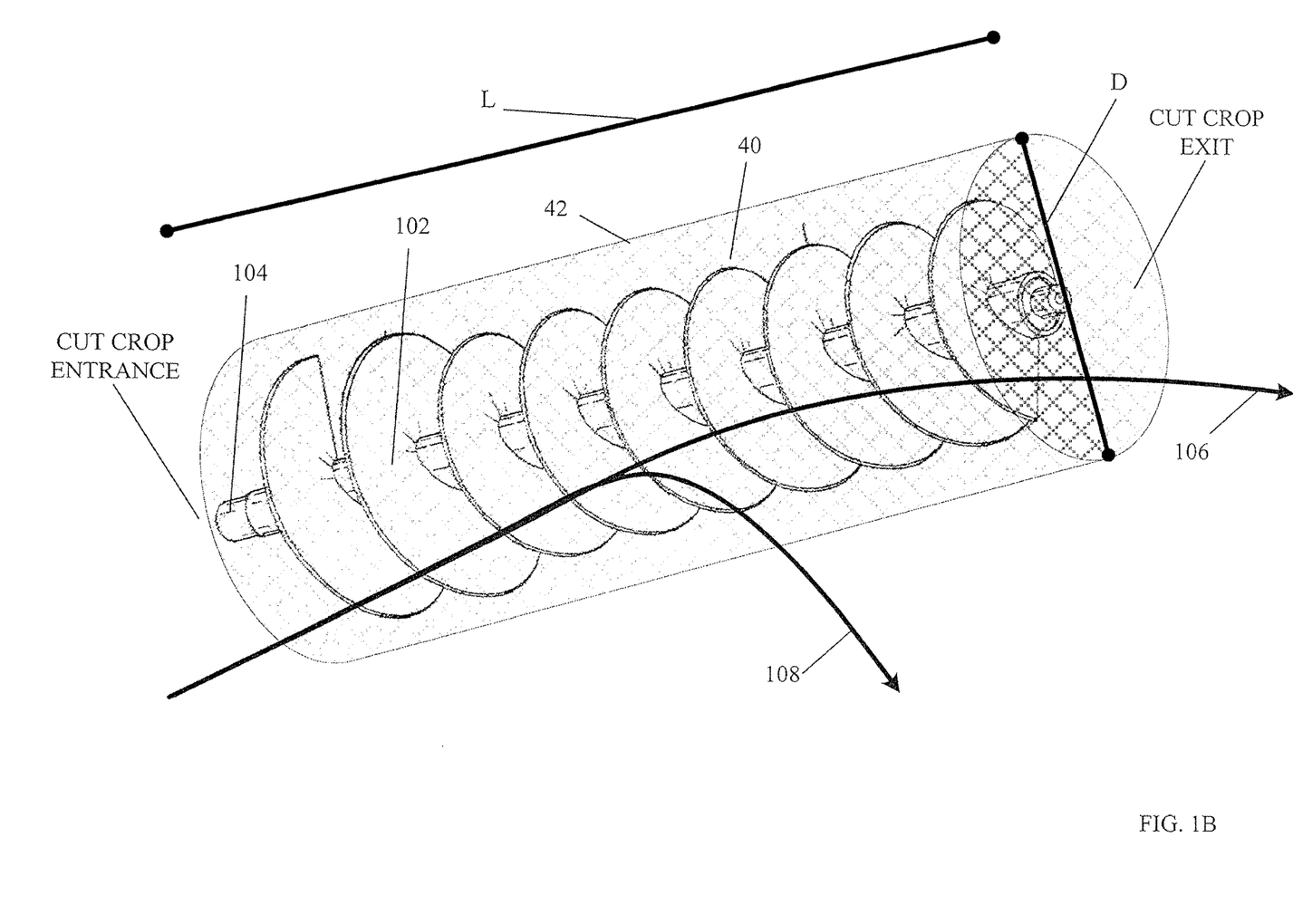
FIG. 1B is a side view of the combine threshing/separating system having a corkscrew rotor and a free-rolling rotor cage, according to an embodiment of the invention.

FIG. 1B shows a perspective view of threshing system 24. Threshing system 24 includes rotor 40 and rotor cage 42. Rotor 40 is an axial rotor that includes spiral blades 102 and shaft 104. Rotor cage 42 of diameter D surrounds rotor 40 in longitudinal direction L. Rotor cage 42 has a perforated cylindrical body that includes perforations of a size large enough for grain to fall through the perforations to the cleaning system, while being small enough to prevent the MOG from falling through to the cleaning system. It should be noted that although FIG. 1B shows rotor 40 completely enclosed by rotor cage 42, that in other embodiments, rotor 40 may only be partially enclosed by rotor cage 42.

During operation of the threshing system in FIG. 1B, rotor 40 rotates at a predetermined speed. Cut crop is fed into a first open portion (cut crop entrance) of rotor cage 42. The rotational movement of rotor 40 threshes the crop to separate the grain from the MOG. Ideally, all of the grain falls through the perforations along path 108 and into the cleaning system where it is cleaned and then collected in the grain tank. Ideally, all of the MOG is propelled by blades 102 through the entire length of rotor cage 42 and exits the rotor cage through a second open portion (cut crop exit) along path 106. This MOG is then transported to the residue system of the combine.

Figure 1C:
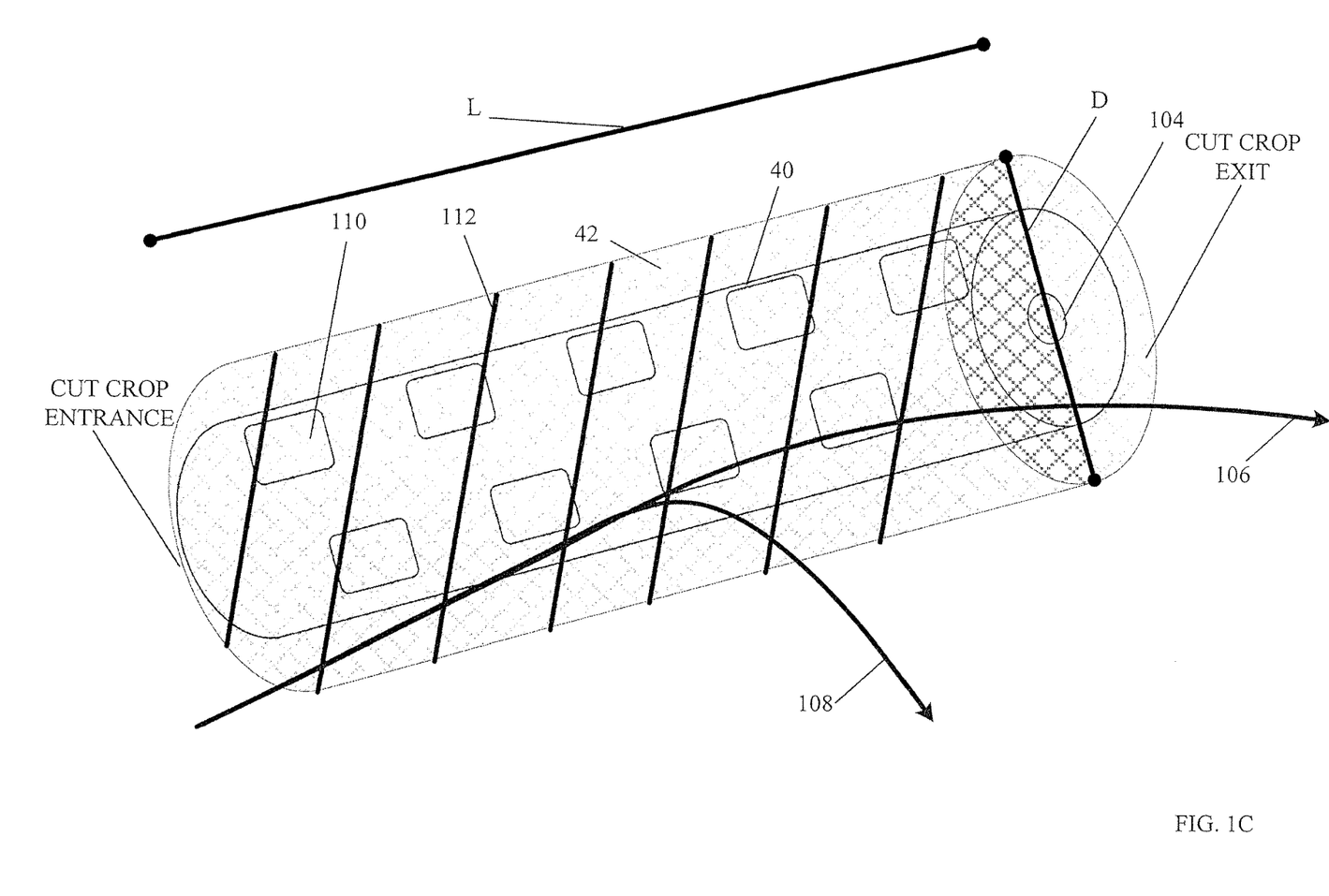
FIG. 1C is a side view of the combine threshing/separating system having a paddle rotor and a free-rolling rotor cage, according to an embodiment of the invention.

FIG. 1C shows another configuration of threshing system 24. Threshing system 24 includes rotor 40 and rotor cage 42. Similar to FIG. 1B, rotor 40 in FIG. 1C is an axial rotor having shaft 104. However, rotor 40 in FIG. 1C includes paddles rather than blades. These paddles are mounted or formed on the outer surface of rotor 40. These paddles may not by themselves be able to propel the cut crop through the length L of rotor cage 42. In order to facilitate the movement of the cut crop, rotor cage 42 in FIG. 1C includes spiral guide vanes 112. These guide vanes are mounted or formed along the inside of the diameter of rotor cage 42 and work in conjunction with paddles 110 to propel the cut crop through the length L of rotor cage 42.

During operation in FIG. 1C, rotor 40 is rotated at a predetermined speed. Cut crop is fed into the cut crop entrance of rotor cage 42. The cut crop is threshed by the rotational movement of rotor 40 to separate the grain from the MOG. Essentially, paddles 110 beat the cut crop to separate the grain from the MOG and the guide vanes help propel the cut crop through the length L of the rotor cage 42. Similar to FIG. 1B, ideally all of the grain should fall through the perforations along path 108 and all of the MOG should be propelled by paddles 110 and guide vanes 112 through the entire length of rotor cage 42 and exit through the cut crop exit along path 106.

During operation, it should be noted that not all of the grain falls through the perforations via path 108, and not all of the MOG exits the rotor cage 42 along path 106. For example, some of the grain exits the rotor cage 42 along path 106 and is expelled from the combine as loss. Likewise, some of the MOG exits the rotor cage 42 through the perforations along path 108 and contributes to the load on the cleaning system.

These two problems are caused by the efficiency of threshing system 24 (e.g. the percentage of grain lost and percentage of MOG entering the cleaning system). Efficiency of the threshing system 24 is negatively affected by the inefficient interaction between rotor and 40 and rotor cage 42. This is because conventional rotor cages are stationary. As rotor 40 is rotated, the rotor blades/paddles push the cut crop against the inside of the rotor cage. The friction between the cut crop and rotor cage loosens the grain from the MOG.

Figure 1D:
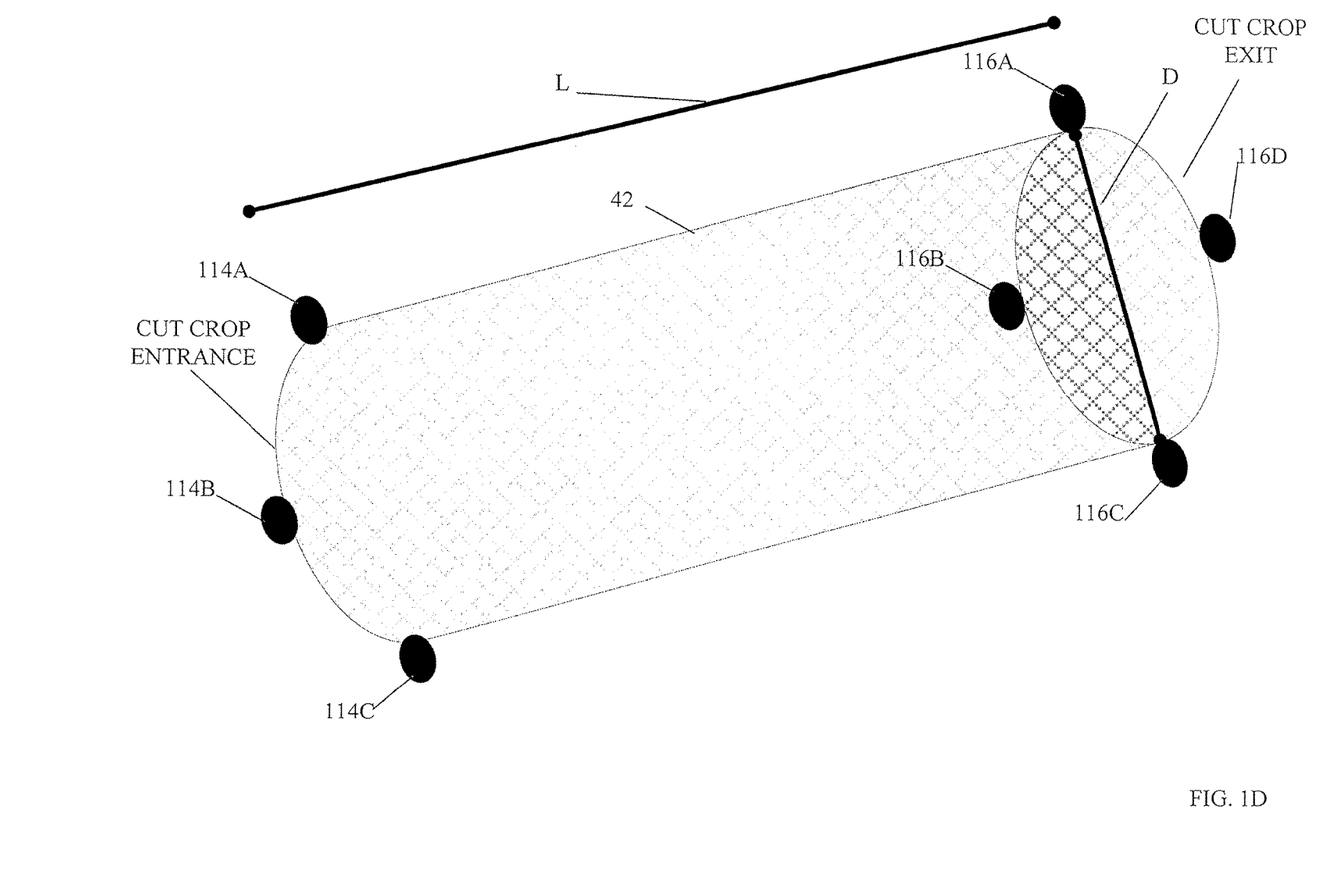
FIG. 1D is a side view of the rotor cage having support bearings on the outside of the free-rolling rotor cage, according to an embodiment of the invention.
Figure 1E:
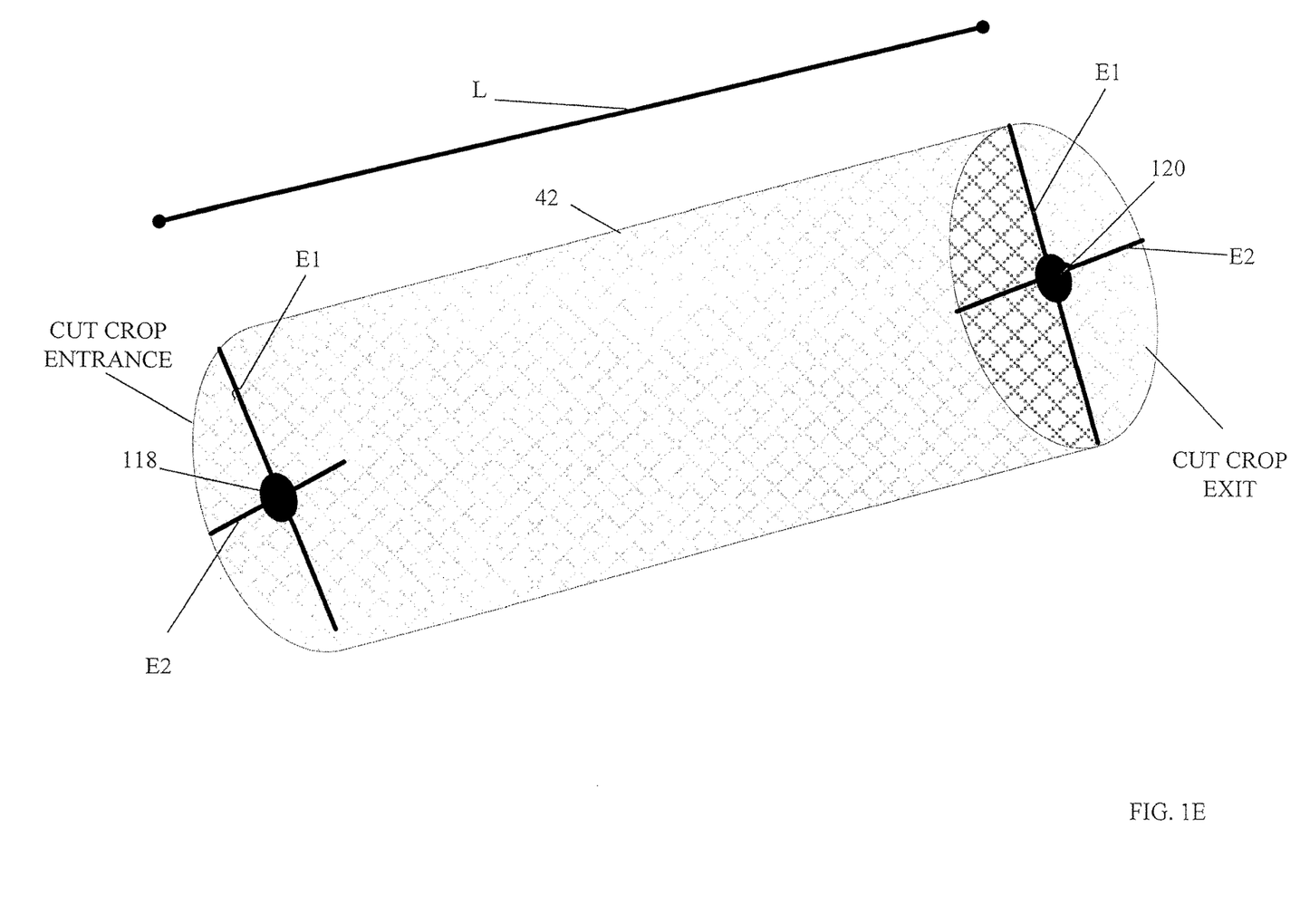
FIG. 1E is a side view of the rotor cage having support bearings on the inside of the free-rolling rotor cage, according to an embodiment of the invention.

A solution for increasing the efficiency of threshing system 24 is to allow rotor cage 42 to rotate. Two examples of rotating rotor cages are shown in FIGS. 1D and 1E. For example, FIG. 1D shows a free-rolling (i.e. non-stationary) rotor cage 42 having diameter D and length L. In order to facilitate the free rotation of rotor cage 42, bearings (e.g. ball bearings) are implemented. FIG. 1D shows a configuration where multiple sets of bearings are mounted outside the diameter of rotor cage 42. Bearings 114A-114C are mounted on a first end portion near the cut crop entrance point, while bearings 116A-116D are mounted on a second end portion near the cut crop exit point. Bearings 114A-114C and 116A-116D define a first and second rotatable coupling point that physically supports rotor cage 42 in its mounted position, and allow rotor cage 42 to freely rotate in either direction (e.g. clockwise or counter-clockwise) about an axis extending between the first and the second rotatable coupling points. Although not shown, bearings 114A-114C and 116A-116D are mounted to a rigid structure within the combine itself. The rigid structure holds the bearings and rotor cage 42 in its proper position within the combine so that cut crop will enter the free-rolling rotor cage, grain will be separated from the MOG, and the MOG will exit the free-rolling rotor cage and be input to the residue system.

Other configurations for providing a freely rotating rotor cage are possible. For example, FIG. 1E shows a free-rolling rotor cage 42 having diameter D and length L. In order to facilitate the free rotation of rotor cage 42, bearings (e.g. ball bearings) may be implemented. In FIG. 1D, however, the bearing are located on the inside of the rotor cage diameter. For example, bearings 118 are mounted on one end near the cut crop entrance point, while bearings 120 are mounted on the opposite end near the cut crop exit point. Although not shown, bearings 118 and 120 are mounted to shaft 104 of rotor 40, and physically connected to the free-rolling rotor cage 42 via extension arms E1 and E2 that connect bearings 118 and 120 to the rotor cage body. In this configuration, free-rolling rotor cage 42 is supported by shaft 104 of rotor 40 and is able to rotate around this shaft. Although FIGS. 1D and 1E show two specific bearing configurations for implementing a free-rolling rotor cage, other equivalent configurations are possible, as long as rotor cage 42 is freely rotatable around the rotor.

Operation of the threshing system is now described with reference to FIGS. 1D and 1E. During operation, rotor 40 is rotated at a predetermined speed for threshing the cut crop. The cut crop is fed into the rotor cage through the cut crop entrance. The blades or paddles of the rotor perform threshing by rubbing the cut crop against the perforations of the rotor cage. The friction between the cut crop and the rotor cage causes the freely rotatable rotor cage to begin rotating in the same direction as rotor 40. The rotation of the rotor cage provides a better mechanism for separating the grain and therefore increases the threshing efficiency of threshing system 24 so that a larger percentage of the grain is extracted and falls through the perforations. In this configuration, the freely-rotatable rotor cage 42 may rotate at any speed up to the actual speed of the rotor. This speed depends on the friction between the rotor cage 42 and the cut crop (e.g. higher friction results in higher rotational speed of the cage).

Figure 1F:
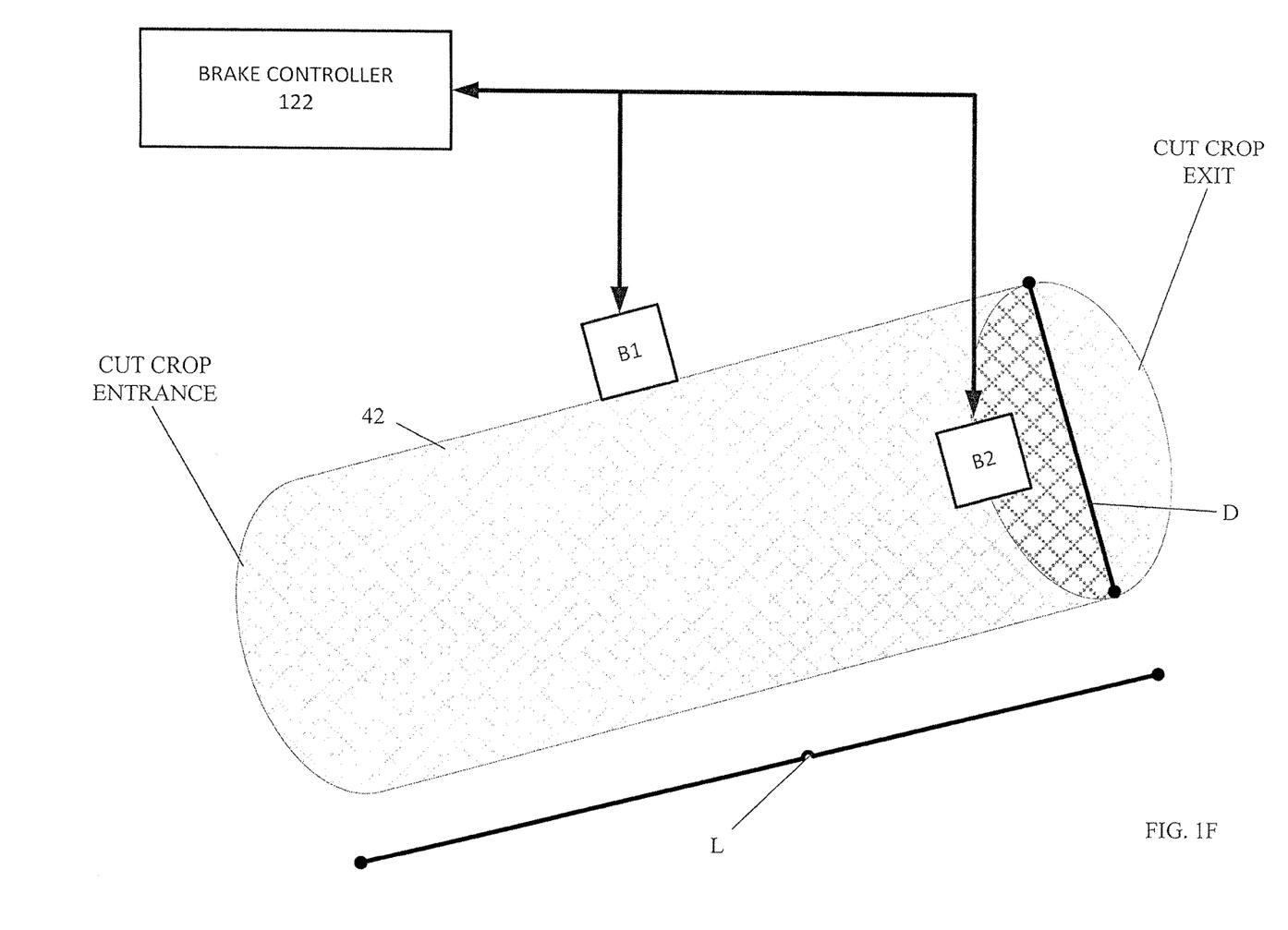
FIG. 1F is a side view of the rotor cage having brakes on the outside of the free-rolling rotor cage, according to an embodiment of the invention.

In one embodiment, rotor 40 and free-rolling rotor cage 42 are configured to spin at different speeds. The free-rolling rotor cage 42 may be equipped with a brake device to prevent the free-rolling rotor cage from rotating at the same speed as the rotor. An example of a brake device in two different configurations is shown in FIG. 1F.

In a first example, brake device B1 is positioned on the outside surface of free-rolling rotor cage 42. Brake device B1 may be implemented as a wheel (e.g. rubber tire) that contacts the outer surface of rotor cage 42 with a predetermined force and rotates at the same speed as the rotor cage (e.g. as free-rolling rotor cage 42 makes one revolution, the wheel in brake device B1 would also make one revolution). Thus, the speed of rotor cage 42 can be monitored and limited by monitoring and limiting the speed of the wheel in brake device B1 to a certain number of revolutions per minute (RPM). The wheel of brake device B1 may be controlled by brake controller 122 (e.g. combine controller 310). Prior to operation, brake controller 122 may set a threshold limit of RPM for free-rolling rotor cage 42 based on the set speed of rotor 40. For example, the RPM of rotor cage 42 may be limited to be half the RPM of rotor 40. During operation, the wheel in brake device B1 may be powered off and therefore free-wheeling. Brake controller 122 simply monitors the speed of the rotor cage based on the speed of the wheel in brake B1 (i.e. they are equivalent). Monitoring speed may be performed by an encoder (not shown) on the rotor cage or on the brake wheel. If the speed of the rotor cage reaches the set threshold, brake device B1 is activated and the speed of the wheel is limited to the threshold speed. The wheel essentially resists the rotor cage from rotating any faster than the threshold speed. Once the speed falls below the threshold, the brake device B1 is once again turned off, allowing the wheel and the rotor cage to be freely rotatable.

In a second example, brake device B2 is positioned near the end portion of rotor cage 42. Brake device B2 may be implemented as a brake pad (e.g. friction pad) that engages the outer rim of free-wheeling rotor cage 42. Thus, the speed of rotor cage 42 can be limited by engaging the friction pad to exert a friction force on the outer rim of rotor cage 42. The friction pad of brake device B2 may also be controlled by brake controller 122 (e.g. combine controller 310). Brake controller 122 may set a threshold limit of RPM for rotor cage 42 based on the set speed of rotor 40. For example, the RPM of rotor cage 42 may be limited to be half the RPM of the rotor 40. During operation, the friction pad in brake device B2 may be powered off and therefore not applying any friction to the outer rim of rotor cage 42. Brake controller 122 simply monitors the speed of the rotor cage by way of a rotary encoder (not shown). If the speed of the rotor cage reaches the set threshold, brake device B2 is activated to apply friction to the outer rim of rotor cage 42 and reduce the speed of rotor cage 42. Once the speed is reduced, the brake device B2 is once again turned off, allowing the rotor cage to be freely rotatable. In other examples, the brake force can be applied at varying levels and increased/decreases as needed.

In one example, brake devices B1 and B2 may be electrical devices (e.g. electric motor driven wheel, and electric driven brake pad). In another example, brake devices B1 and B2 may be hydraulic devices (e.g. hydraulically driven motor driven wheel, and hydraulically driven brake pad). In yet another example, brake devices B1 and B2 may be purely mechanical devices (e.g. spring-loaded clutch for actuating the wheel, and spring-loaded clutch for actuating the brake pad). In the purely mechanical example, brake devices B1 and B2 would not be connected to brake controller 122, and an encoder would not be needed.

Figure 2:
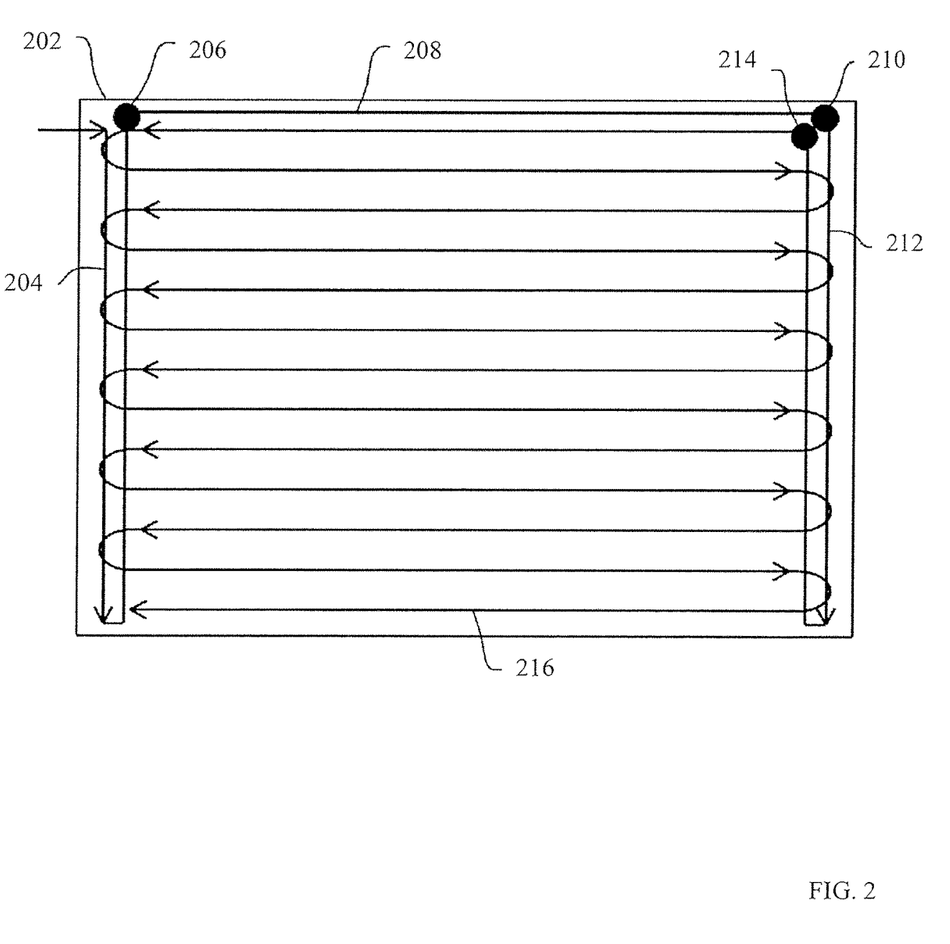
FIG. 2 is a typical path traversed by the combine during harvesting, according to an embodiment of the invention.

During harvesting, the threshing system 24 is operational. The pathways shown in FIG. 2 are typical for a plot of land 202 that is to be harvested. Typically, as harvesting is performed, the combine employs residue system 70 to perform spreading and/or windrowing of the harvested crops at different locations of the field. For example, the combine may start performing spreading along path 204. Once the combine reaches point 208, a turn is made and spreading is performed along path 206. Once the combine reaches point 210, a turn is made and spreading is performed along path 212. Finally, once the combine reaches point 214, a turn is made and windrowing is performed in a zig-zag pattern along path 216.

During harvesting (e.g. while traveling the pathways shown in FIG. 2), the combine controls the threshing system 24 to thresh the cut crop. Specifically, the combine may control the speed of rotor 40 and also limit the rotational speed of freely rotatable rotor cage 42. The decision to may be based on various factors, including but not limited to speed thresholds, grain loss, etc. In addition, the operator, or any other person (e.g. farm owner, farm manager, etc.) may set these values. The combine automatically controls the rotor speed and the rotor cage speed based on these set values.

Figure 3:
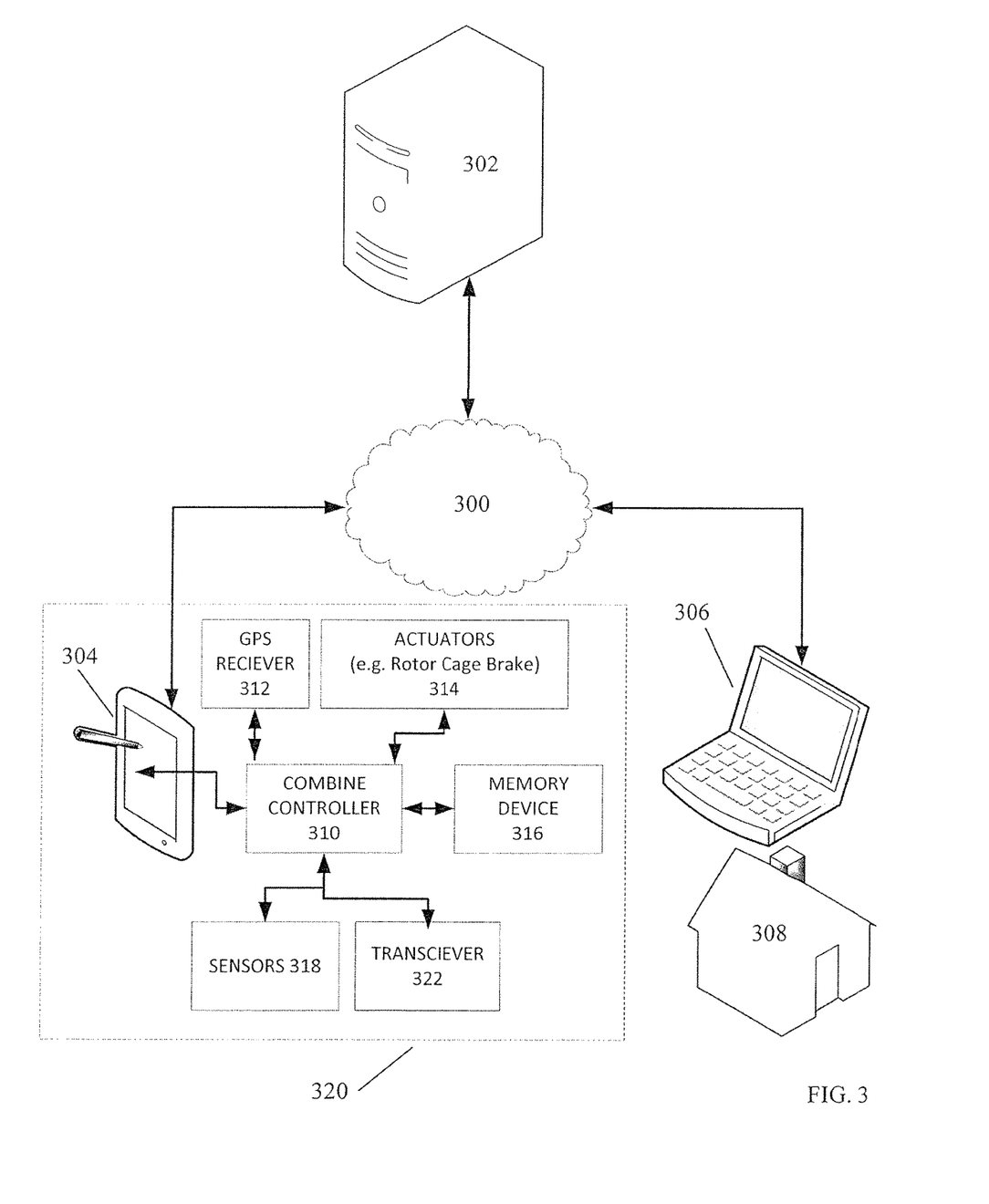
FIG. 3 is a system view of network based communication between the combine controller, a remote personal computer and a server, according to an embodiment of the invention.

Setting the rotor speed and the limit for the rotor cage speed is a process that can be performed while in the combine via a user interface, or while remote from the combine via a personal computer (PC). FIG. 3 shows an example of a system for controlling the combine. The system includes an interconnection between a control system 320 of combine 10, a remote PC 306 at location 308, and a remote server 302 through network 300 (e.g. Internet). It should be noted that combine 10 does not have to be connected to other devices through a network. The controller of combine 10 can be a standalone system that receives operating instructions (e.g.) through a user interface, or through a removable memory device (e.g. Flash Drive).

Prior to operating combine 10, an operator designates rotor speed and rotor cage speed settings. In one example, the operator uses interface 304 of the combine control system or PC 306 located at remote location 308. Interface 304 and PC 306 allow the operator to view locally stored parameters from memory device 316 and/or download parameters via transceiver 322 (e.g. WiFi, Bluetooth, Cellular, etc.) from server 302 through network 300. The operator may select (via Interface 304 or PC 306) appropriate speeds based on various factors including, but not limited to speed thresholds, throughput, loss, yield, type of crop, etc. Once the speeds are selected, the operator can begin harvesting. Combine controller 312 then controls actuators 314 (e.g. rotor motor and rotor cage brake) based on these set speeds. For example, sensors 318 (e.g. loss sensors) may be used during harvesting to compare loss to the threshold in order to automatically control the relative speed between the rotor and the rotor cage. It should also be noted that harvesting may also be tracked and aided by GPS receiver 312.

Figure 4:
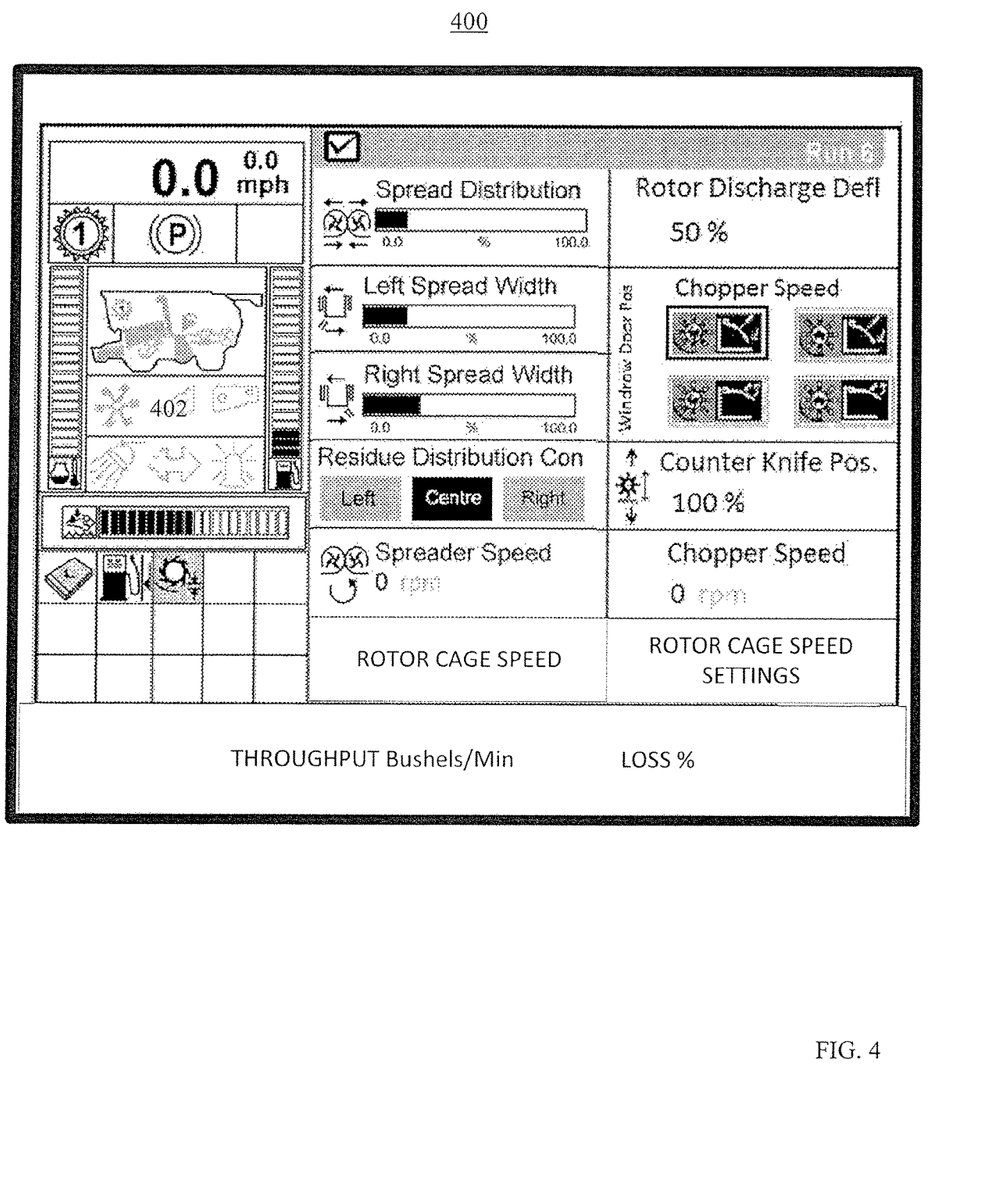
FIG. 4 is an illustration of a user interface for monitoring and controlling the combine, according to an embodiment of the invention.

An example of interface 304 is shown in FIG. 4 wherein various parameters and data are displayed to the operator through a graphical user interface (GUI) 400. These may include a view of the map 402 with designated zones, land grade (not shown), current operational mode (spreading/windrow modes), and operational parameters/states for the spreader wheels, chopper states, rotor speed, rotor cage speed, counter knives, windrow door, etc. These parameters may be set or changed by the operator prior to harvesting or during harvesting. For example, the operator can use a stylus or their finger on the touchscreen to select the rotor cage speed settings. In one example, the operator can then limit the rotor cage speed to a percentage of the rotor speed (e.g. rotor cage speed may be limited to 50% of rotor speed). Thus, the rotor cage will freely rotate up to the limit set by the operator, at which point the brake device will engage and limit the speed. In another example, the operator can then set the rotor cage speed to a percentage grain loss (e.g. rotor cage speed is changed to minimize grain loss). Thus, the brake device will engage or disengage the rotor cage to set a speed that minimizes grain loss.

Figure 5A:
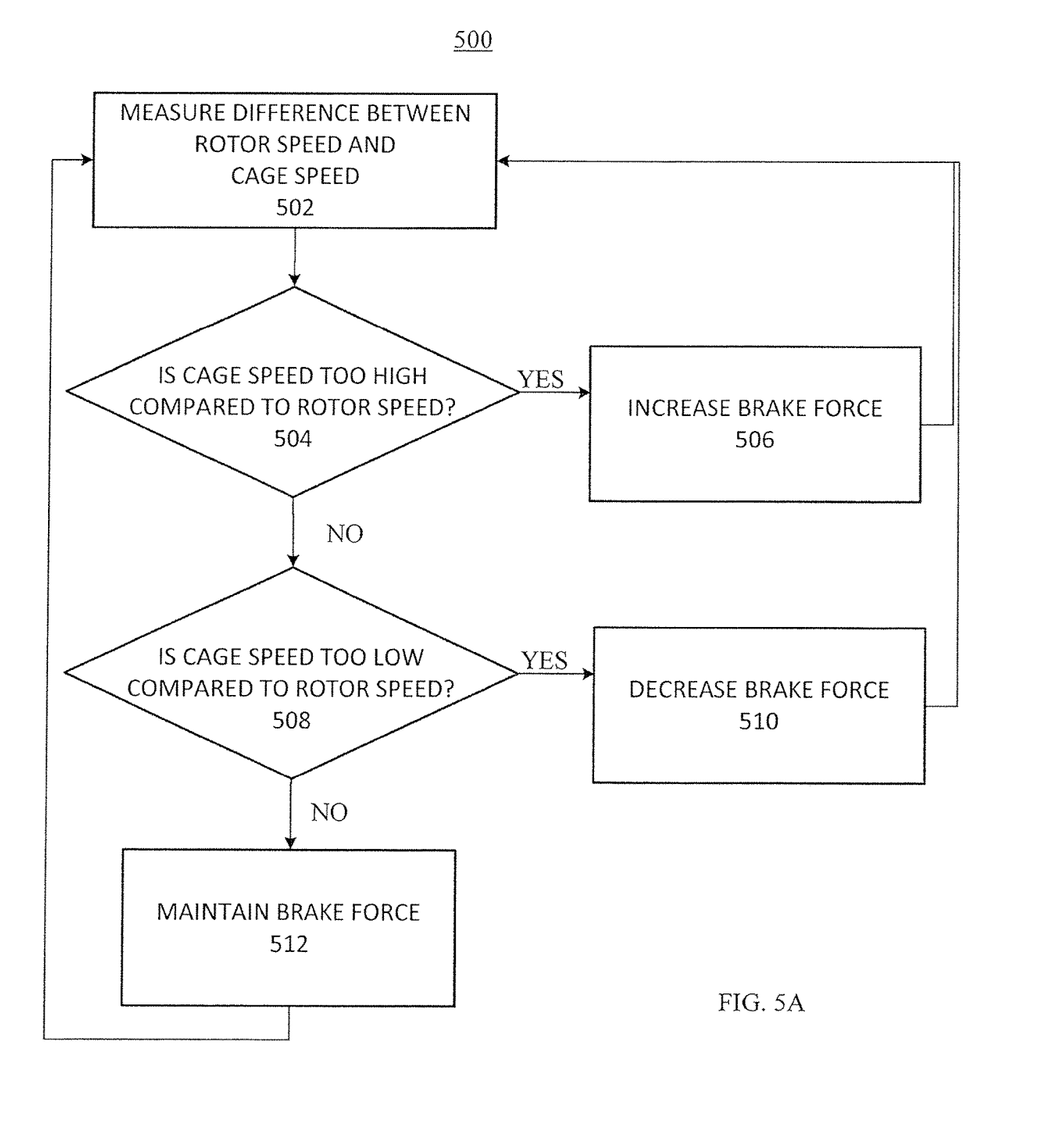
FIG. 5A is a flowchart of steps for controlling the free-rolling rotor cage based on relative speed, according to an embodiment of the invention.
Figure 5B:
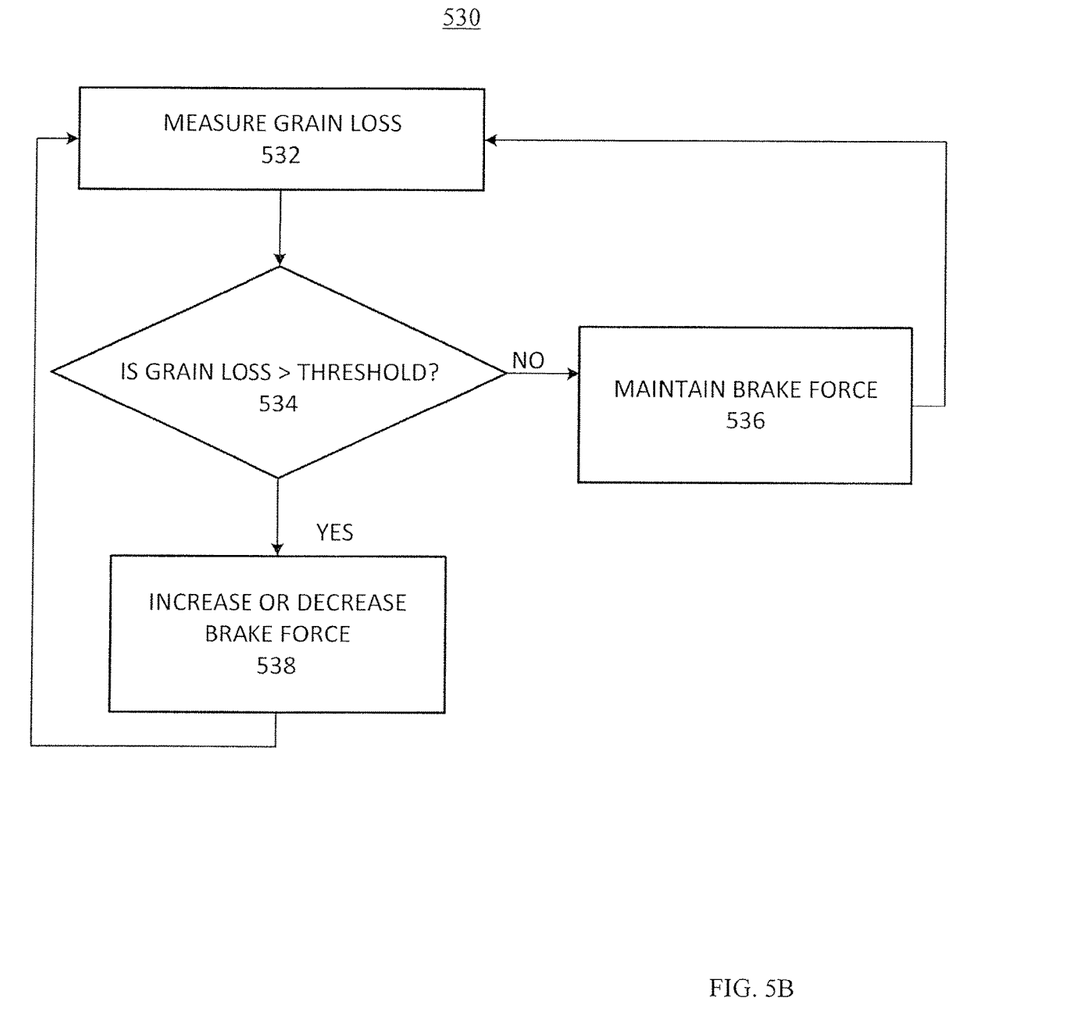
FIG. 5B is a flowchart of steps for controlling the free-rolling rotor cage based on grain loss, according to an embodiment of the invention.

Examples of limiting and/or controlling the speed of rotor cage 42 are described in FIGS. 5A and 5B. For example, FIG. 5A shows a flowchart for controlling the rotor cage based on rotor speed. In step 502, the combine controller measures the difference between the rotor speed and the rotor cage speed. This measurement may be performed by way of rotational encoders on the rotor and on the rotor cage. An upper threshold (e.g. 75% of rotor speed) may be set for limiting the rotational speed of the rotor cage. In step 504, the combine controller determines if the cage speed is too high compared to the rotor speed (e.g. above the 75% threshold). If the speed is too high, the brake force is either applied for the first time, or increased if it is already engaged with the rotor cage in an attempt to slow the rotor cage (step 506). If, however, the speed is not too high (e.g. below the 75% threshold), the combine controller moves on to step 508. A second lower threshold (e.g. 25% of rotor speed) may also be set for limiting the rotational speed of the rotor cage. In step 508, the combine controller determines if the cage speed is too low compared to the rotor speed (e.g. below the 25% threshold). If the speed is too low, the brake force is decreased in an attempt to allow the rotor cage to speed up (step 510). If, however, the speed is not too low (e.g. between the 25% and 75% threshold), the combine controller determines that the rotor cage speed is in the proper range and maintains the brake force (step 512). Essentially, combine controller can maintain the rotor cage speed in an optimal range (e.g. range that has the highest threshing efficiency) by increasing or decreasing the brake force applied by the braking device.

Rather than controlling the speed of the rotor cage based on the relative speed to the rotor, the combine may control the speed of the rotor cage based on grain loss. As shown in FIG. 1A, grain loss sensor 113 is positioned near the exit portion of the rotor cage (near where the crop is expelled from the rotor cage). When grain is not properly threshed from the MOG, the grain is expelled from this portion of the rotor cage. This grain makes a distinctive sound when hitting the sieves that is detected by sensor 113. The combine controller can then determine loss based on this grain loss detection and control the brake device accordingly.

For example, as shown in FIG. 5B, the grain loss is measured (step 532). The combine controller then compares the grain loss to a threshold (step 534). If the grain loss is greater than threshold, then the brake force is increased or decreased (step 538) in an attempt to reduce grain loss. If, however, the grain loss is not greater than the threshold, then the brake force is maintained (step 536). Thus, the speed of the rotor cage is controlled to minimize grain loss and therefore maximize threshing efficiency.

Steps 502-512 and 532-538 shown in FIGS. 5A and 5B are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIGS. 5A and 5B, are implemented in software code or instructions which are tangibly stored on a tangible computer readable medium. Upon loading and executing such software code or instructions by the controller 310, the controller 310 may perform any of the functionality of the controller 310 described herein, including the steps shown in FIGS. 5A and 5B described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A threshing and separating system comprising:
   a non-stationary rotor cage including a perforated cylindrical body extending in a longitudinal direction from a first open end portion to a second open end portion, the first open end portion supported by a first rotatable coupling point, and the second open end portion supported by a second rotatable coupling point; and
   a rotor driven by a motor to rotate in a rotational direction within the non-stationary rotor cage to thresh harvested crop,
   wherein the non-stationary rotor cage is driven by friction between threshed harvested crop and the rotor cage to rotate in the rotational direction about an axis extending between the first rotatable coupling point and the second rotatable coupling point.

2. The threshing and separating system of claim 1, wherein the first rotatable coupling point includes and the second rotatable coupling point include bearings for supporting the rotation of the non-stationary rotor cage.

3. The threshing and separating system of claim 2, wherein the bearings are positioned inside a diameter of the non-stationary rotor cage to couple the non-stationary rotor cage to a shaft of the rotor.

4. The threshing and separating system of claim 2, wherein the bearings are positioned outside a diameter of the non-stationary rotor cage to couple the non-stationary rotor cage to a support structure outside the diameter of the non-stationary rotor cage.

5. The threshing and separating system of claim 1, further comprising:
   a brake device coupled to the non-stationary rotor cage, the brake device limiting the rotational speed of the non-stationary rotor cage.

6. The threshing and separating system of claim 5, wherein the brake device is coupled to the non-stationary rotor cage at a point inside a diameter of the non-stationary rotor cage.

7. The threshing and separating system of claim 5, wherein the brake device is coupled to the non-stationary rotor cage at a point outside a diameter of the non-stationary rotor cage.

8. The threshing and separating system of claim 5, wherein the brake device is an electric powered wheel that applies a force to the non-stationary rotor cage so that the non-stationary rotor cage rotates at the same speed as the wheel.

9. The threshing and separating system of claim 5, further comprising:
   a rotary encoder coupled to the non-stationary rotor cage for measuring the rotational speed of the non-stationary rotor cage,
   wherein the brake device limits the rotational speed of the non-stationary rotor cage based on the output of the rotary encoder.

10. The threshing and separating system of claim 5,
wherein the brake device includes a friction pad and a spring-loaded clutch, the spring-loaded clutch causing the friction pad to apply braking force to the non-stationary rotor cage when a rotational speed of the non-stationary rotor cage reaches a predetermined threshold.

11. A combine including:
a feeder housing for receiving harvested crop;
a non-stationary rotor cage including a perforated cylindrical body extending in a longitudinal direction from a first open that receives the harvested crop end portion to a second open end portion that expels the harvested crop, the first open end portion supported by a first rotatable coupling point, and the second open end portion supported by a second rotatable coupling point; and
a rotor driven by a motor to rotate in a rotational direction within the non-stationary rotor cage to thresh the harvested crop,
wherein the non-stationary rotor cage is driven by friction between threshed harvested crop and the rotor cage to rotate in the rotational direction about an axis extending between the first rotatable coupling point and the second rotatable coupling point.

12. The combine of claim 11,
wherein the perforated cylindrical body of the non-stationary rotor cage is rotated around the rotor by friction caused by the threshing of the harvested crop.

13. The combine of claim 11,
wherein the rotation of the rotor feeds the harvested crop into the first open end portion of the non-stationary rotor cage, and propels the harvested crop through the perforated cylindrical body of the non-stationary rotor cage causing friction between the harvested crop and the non-stationary rotor cage to rotate the rotor cage in the direction of the rotor rotation.

14. The combine of claim 11, further comprising:
a brake device coupled to the non-stationary rotor cage, the brake device limiting the rotational speed of the non-stationary rotor cage.

15. The combine of claim 14,
wherein the brake device is coupled to the rotor cage at a point inside a diameter of the non-stationary rotor cage, or
wherein the brake device is coupled to the rotor cage at a point outside a diameter of the non-stationary rotor cage.

16. The combine of claim 14, further comprising:
a rotary encoder coupled to the non-stationary rotor cage for measuring the rotational speed of the non-stationary rotor cage.

17. The combine of claim 14, further comprising:
a controller configured to:
determine the rotational speed of the non-stationary rotor cage, and
control the brake device according to the rotational speed.

18. The combine of claim 17,
wherein the controller is further configured to:
increase brake force applied by the brake device when the rotational speed of the non-stationary rotor cage is greater than a first threshold, and
decrease brake force applied by the brake device when the rotational speed of the non-stationary rotor cage is less than a second threshold.

19. The combine of claim 17, further comprising:
wherein the controller is further configured to:
measure grain loss, and
increase brake force applied by the brake device when grain loss is greater than a threshold.

20. The combine of claim 14, further comprising:
a spring-loaded clutch coupled to the brake device, the spring-loaded clutch causing the brake device to apply braking force to the non-stationary rotor cage when a rotational speed of the non-stationary rotor cage reaches a predetermined threshold.

\* \* \* \* \*